Sept. 19, 1950   J. B. H. KUPER ET AL   2,523,122
GENERATOR OF ULTRA HIGH FREQUENCY OSCILLATIONS
Filed July 3, 1943   3 Sheets-Sheet 1

INVENTORS
James B. H. Kuper
Peter Aldrich Cole
BY *P. E. Bush*
ATTORNEY

Sept. 19, 1950     J. B. H. KUPER ET AL     2,523,122
GENERATOR OF ULTRA HIGH FREQUENCY OSCILLATIONS
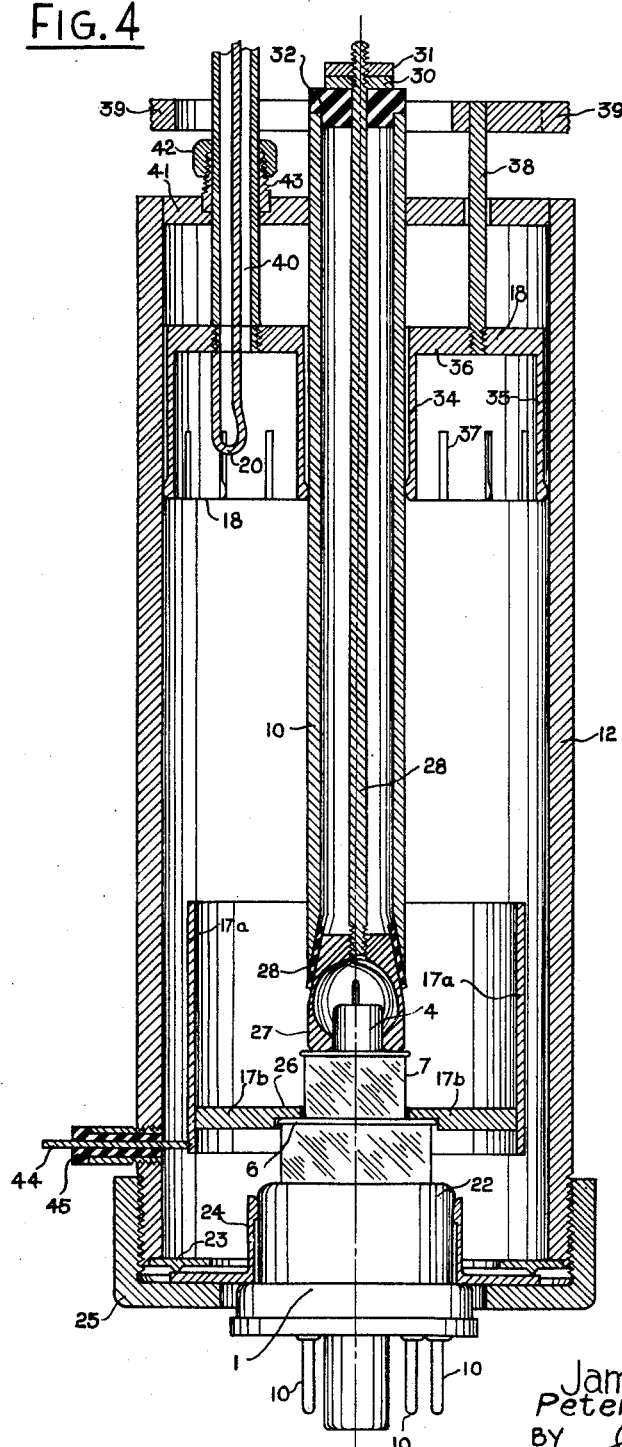
INVENTORS
James B. H. Kuper
Peter Aldrich Cole
BY
ATTORNEY Sept. 19, 1950 J. B. H. KUPER ET AL 2,523,122
GENERATOR OF ULTRA HIGH FREQUENCY OSCILLATIONS
Filed July 3, 1943 3 Sheets-Sheet 3

INVENTORS
James B.H. Kuper
Peter Aldrich Cole

BY
ATTORNEY

Patented Sept. 19, 1950

2,523,122

UNITED STATES PATENT OFFICE 2,523,122

GENERATOR OF ULTRA HIGH FREQUENCY OSCILLATIONS

James B. H. Kuper, Redding, Conn., and Peter A. Cole, Belmont, Mass., assignors, by mesne assignments, to the United States of America as represented by the Secretary of the Navy Application July 3, 1943, Serial No. 493,448

16 Claims. (Cl. 315—39)

This invention relates to apparatus for the production of electrical oscillations of high frequency and particularly frequencies higher than about 1500 megacycles. The invention specifically concerns adjustable resonating structures for use together with vacuum tubes of the triode type having closely spaced elements and designed for high-frequency operation.

Resonating structures for oscillator circuits operating at the frequencies here in question, in order to reduce circuit losses, are commonly built with relatively large conducting surfaces and developed so as to constitute resonant cavities which take the place of the "lumped-constant" tuned circuits used at lower frequencies. Likewise connecting leads between such a resonator structure and the vacuum tube in question are usually kept as short as possible. Wherever practical, it is desirable to design the physical structure to fit closely on the vacuum tube.

In spite of the recognition of the above-mentioned principles, until recently apparatus for use with vacuum tubes to produce oscillations at 1500 megacycles or higher frequencies, especially those in the neighborhood of 3000 megacycles, gave considerable difficulty, because simultaneous adjustment of two or more elements of the structure was generally necessary for varying the frequency of operation. There has been some recent improvement in such apparatus providing for tuning with a single adjustment, but such apparatus was, before the present invention, generally limited in tuning range to about 7 per cent of the wave length.

It is an object of the present invention to provide an improved form of resonating structure for use with vacuum tubes having closely spaced elements for the production of high-frequency oscillations, which improved form may permit tuning over a wider range of wave lengths than has heretofore been possible and to provide such tuning by a single adjustment. A further object of the present invention is to provide a resonating structure for the aforesaid purpose wherein the frequency of operation is substantially independent of the length of the structure connected to the grid of the vacuum tube so that a single structure may be employed to provide oscillations over a range of wave length of 20 or even 30 or 35 percent of the mean wave lengths of operation.

The invention will be described and explained with reference to the drawings, in which:

Fig. 4 shows in longitudinal cross section one form of apparatus for producing high-frequency oscillations in accordance with the present invention;

Figs. 1 and 2 show two forms of apparatus which, although they have some physical resemblance, involve different electrical modes of operation and function on different principles. Fig. 3, as will be presently explained, illustrates some of the differences between the respecting modes of operation of the two devices.

Figure 1:
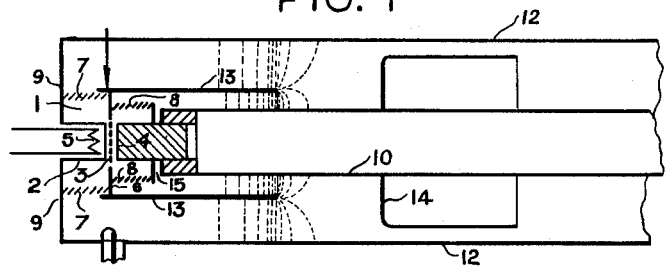
Fig. 1 is a diagram of a type of apparatus in use prior to the present invention for producing high-frequency electrical oscillations.
Figure 2:
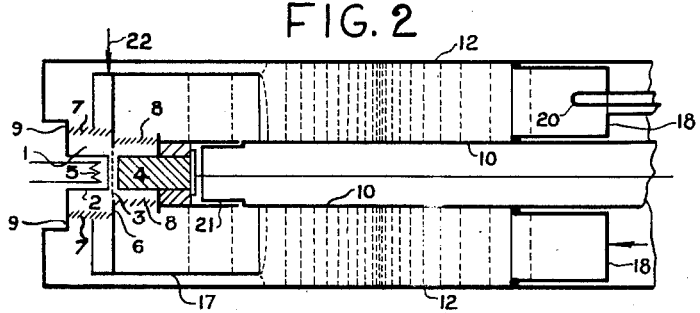
Fig. 2 is a diagram of one form of apparatus constructed in accordance with the present invention for producing high-frequency electrical oscillations.

In both Figs. 1 and 2, there is shown a vacuum tube 1 having close spaced elements including a cathode 2, a grid 3 and an anode 4. The cathode 2 is heated by a suitable heater 5. The grid terminal of the vacuum tube is brought out into a ring or disk 6 in order to facilitate coupling of the grid to a cylindrical conductor or the like. Glass walls of the tube are shown at 7 and 8. The cathode connection is brought out, either directly or through a by-pass capacitance (not shown) to another conducting ring or disk 9. The particular form of the vacuum tube is not a part of the present invention, although it is to be understood that a vacuum tube of the type just described, such as the type GL446 and the type GL464, is preferred for operation in conjunction with the apparatus of the present invention, because of the advantageous electrical and mechanical qualities of such a vacuum tube.

In both Figs. 1 and 2, the anode 4 is effectively connected to an inner cylindrical conductor 10 and the cathode to an outer cylindrical conductor 12. In the form of apparatus shown in Fig. 1, the grid 3 is connected to a cylinder 13 partially enclosing the cylindrical conductor 10 and of such a diameter that the right-hand end of the cylinder 13 forms a substantially open-circuited termination (looking towards the right) of the coaxial conductor transmission line or resonator formed by the cylinders 13 and 10 in their overlapping portions. If the cylinder 13 has a diameter of the value of, or not greatly different from, the geometric mean of the outer diameter of the cylinder 10 and the inner diameter of the cylinder 12, the space between the cylinders 12 and 13 may be regarded as a continuation of the space between the cylinders 10 and 13, so that the device may be regarded as a folded resonant transmission line, folded on itself around the right-hand end of the cylinder 13. In general the end of the cylinder 13 will be found to be a current node, so that the position of the structure 14 to the right will have relatively little influence on the tuning of the device. The location of a current node at or near the end of the cylinder 13 seems to be necessary for practical operation of this type of structure so that the structure may also be regarded as having two open-ended resonators terminating at the right-hand end of the cylinder 13, coupled through the space to the right of cylinder 13.

The structure 14 provides a radio-frequency connection between the cylinders 10 and 12 in accordance with known principles and need not be adjustable longitudinally, since longitudinal adjustments would not provide any substantial amount of tuning. The position of the structure 14 most desirable for continuous operation is different from that desirable for short-pulse operation, however. The position of the structure 14 thus appears to have some effect on determining the coupling between the resonant line inside the cylinder 13 and that outside the cylinder 13. The natural frequency of the resonator constituted by the conductors 10, 13 and 12 is most conveniently varied by displacing longitudinally the cylinder 10 with respect to the anode terminal 4, thereby varying the dimensions of a circumferential gap 15, a tuning method invented by Howard L. Schultz and Harold G. Cooper and described in a patent application Serial No. 493,778, filed July 7, 1943, and entitled "Tuning of Electrical Resonators." This tuning method permits variation of the wave length of oscillations produced over a range of about 1 cm. when the average wave length is in the neighborhood of 10 cm. By mounting the structure 14 on the cylinder 10 the small tuning effect of the motion of the structure 14 is superimposed in the same sense on the tuning effect of slipping the plunger 14 on the anode stud 4. Other methods of tuning are also possible, such, for instance, as the moving of an annular mass of polystyrene axially between the cylinders 10 and 13.

It is also found to be generally important when short-pulse operation is desired that the "overhang" or extension of the cylinder 13 to the left of the grid terminal 6 should be of a particular length, usually not more than .01 wave length. The critical nature of this adjustment in some cases of short-pulse operation probably results from the stricter requirements as to feedback conditions imposed by short-pulse operation.

The resonator of Fig. 1 may thus be regarded as a resonator loaded at one end by the grid-anode capacitance, so that the length of the cylinder 13 has a preponderant influence on the resonant frequency of the device.

It is to be understood that the representation of the electrical lines of force on Fig. 1 is the result of theoretical deduction rather than direct observation. The underlying facts, however, such as the importance of the length of the cylinder 13 and the substantial absence of tuning effect related to the position of the structure 14, are matters of experimental observation.

The apparatus of the present invention operates in the manner illustrated in Fig. 2. The grid terminal 6 is in this case connected to a cylindrical structure 17 having a diameter approaching that of the cylinder 12 but sufficiently smaller than the latter to avoid undesirably large circumferential variations in the clearance between the two cylinders when small errors in alignment are introduced by accident. Because the inner diameter of the cylindrical structure 17 is almost the same as the inner diameter of the cylinder 12, the electrical discontinuity in the transmission line formed by the cylinder 10 as inner conductor and the surrounding cylinders as outer conductors is relatively small, and the entire structure from the grid terminal 6 to the short-circuiting plunger 18 connecting the cylinders 10 and 12 forms an electrical resonator or, in other terms, a resonant section of transmission line. The length, and hence the natural period, of this resonator is varied by longitudinal movements of the plunger 18. The greatest concentration of the electrical lines of force in such a resonator is not necessarily in the neighborhood of the right-hand end of the cylinder 17; indeed, it is preferably between the end of the cylinder 17 and the plunger 18. The cylinder 17 may be said to be coupled capacitively to the cylinder 12, or it may be regarded as being separated from the cylinder 12 at its right-hand end only by a transmission line of low characteristic impedance. If the transmission line formed by the cylinders 17 and 12 is of suitable length, the impedance at the right-hand end may be sufficiently small to produce only a very small electrical discontinuity in the main resonator, which is coupled to the anode-grid space of the vacuum tube.

Figure 5:
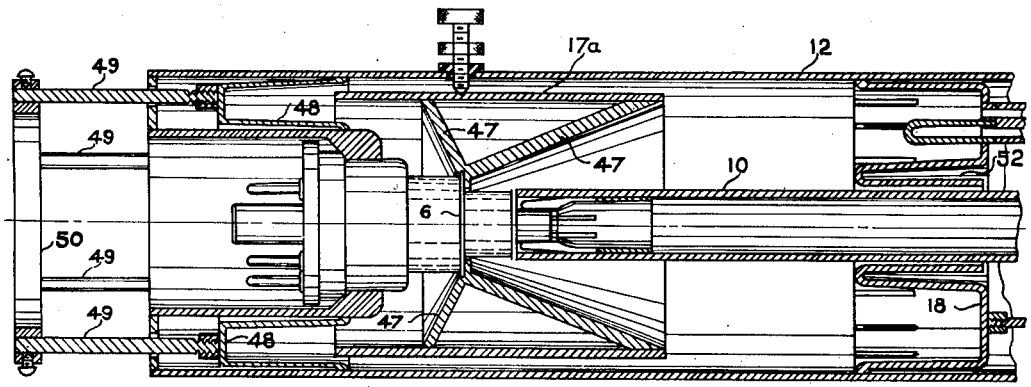
Fig. 5 shows, also in longitudinal cross section, another form of apparatus embodying the present invention.

The grid-cathode space of the vacuum tube is coupled to the main resonator just described through the transmission line formed by the cylindrical structure 17 and the cylinder 12. The grid-plate resonator is a relatively high Q resonator whereas the low impedance line formed by the cylinders 17 and 12 and its coupling to the grid-cathode space of the vacuum tube does not involve so high a Q (probably because of the higher electron-loading of the grid-cathode space), so that the grid-cathode circuit is relatively easily "pulled" by the tuning of the grid-plate circuit. The length of the cylinder 17, either to the left or to the right of the grid connection 6 is not at all critical and may be varied within wide limits, since the important dimension of the grid-plate resonator is the length of line between the grid terminal 6 and the plunger 18. When the length of the cylinder 17 is varied, in order to maintain the proper phase of feedback to the grid-cathode circuit, an adjustment may be desirable in the configuration of the space between the conducting structure connected to the grid and cathode and situated to the left of the cylinder 17. This adjustment is usually only a design adjustment, and normally does not require adjustability in use of the apparatus but only proper care in design of the apparatus. For certain types of wide range tuning apparatus, however, it may be desirable to make the enclosed space at the left of the cylinder 17 variable, as shown in Fig. 5 and more fully described in connection therewith.

A convenient way of coupling the oscillations of the apparatus of Fig. 2 to an output device or transmission line is provided by the coupling loop 20 mounted in the plunger 18. This arrangement locates the coupling loop in the neighborhood of high intensity magnetic fields. It will be noted that the plunger 18 is in the shape of an annular cup having a depth which is a substantial fraction of the mean wave length of the device, say one-eighth or more (preferably a quarter-wave length), in order to reduce contact losses by providing the contact boundaries at locations of moderate or low current instead of at locations of high current density.

Output coupling could also be obtained by the well known electrostatic means of inserting a probe into the resonator in a region of intense alternating electric field. If desired the probe could be provided in adjustable form to permit variation of the extent the probe penetrates into the field of the resonator.

As a matter of convenience, the conductor 10 is insulated from the anode potential by means of an annular by-pass condenser shown at 21. A connection for setting the average potential of the grid 3 is shown diagrammatically at 22. The connection 22 may include means for physically positioning the cylindrical structure 17 in the desired relation and in firm contact with the grid terminal 6. The connection 22 may simply connect the cylindrical structure 17 electrically to the cylinder 12, or it may connect the cylindrical structure 17 to a source of bias voltage. The latter arrangement is preferred because it enables one to provide means for varying the grid voltage and thereby varying the oscillatory output of the tube and also permits adjusting the grid bias to a value adapted for most efficient operation of the tube.

With apparatus of the type shown in Fig. 2, a relatively wide range of tuning can be obtained. Thus it is possible to provide, for instance, an apparatus capable of furnishing substantially full power at all wave lengths between 15 and 18 cm. Such an apparatus will be able to provide oscillations at lower power levels even beyond this range. The relatively wide range of tuning of the apparatus of Fig. 2 is illustrated by certain typical curves plotted in Fig. 3.

Figure 3:
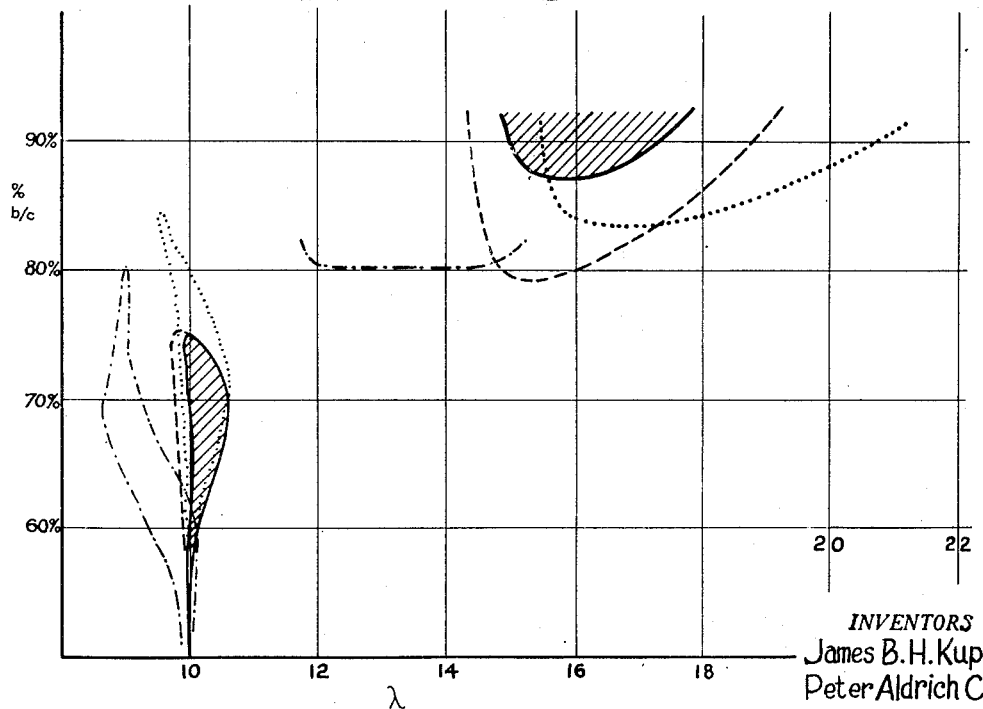
Fig. 3 is a graph illustrating the difference in characteristic of the oscillations produced by the apparatus of the type of Fig. 1, and the oscillations produced by apparatus of the type of Fig. 2.

In Fig. 3 the ratio of the inner diameter of the cylinder 17 to the inner diamter of the cylinder 12, designated as $b/c$, $b$ being the first-mentioned diameter and $c$ the second, the said ratio being expressed as a percentage, is plotted as the ordinate against the wave length as abscissa. Curves are drawn showing the limits of wave length between which oscillations can be obtained by the usual tuning adjustments, for various values of the said diametral ratio. For any fixed set of the other dimensions, there will in general be two regions in which oscillations are obtained, one region which is narrow in its horizontal (wave lengths) width, for small values of $b/c$ which correspond to structures of the type of Fig. 1, and another region corresponding to large values of $b/c$ which is relatively wide in its horizontal width. It has been found difficult to obtain oscillations with apparatus of the type illustrated in Fig. 2 at wave lengths as short as those obtainable with the same vacuum tube in an arrangement such as that of Fig. 1, so that the second of the above-mentioned regions will usually appear at longer wave lengths, although with refinements of construction oscillations of shorter wave length may be obtained. Thus, for instance, short wave lengths as short as, or shorter than, those heretofore obtained with arrangements of the type of Fig. 1 may be obtained in accordance with this invention with the type of construction shown in Fig. 5.

On Fig. 3, the solid curve enclosing the shaded area relates to a structure in which the inner diameter of the cylinder 12 was one and one-half inches. This curve shows the region within which oscillations measured at a power level of twenty milliwatts or more were obtained with a type GL446 vacuum tube when the apparatus was modified by varying the diameter of the cylindrical structure connected to the grid terminal 6. The dashed lines indicate the region within which any oscillations at all were obtained with the same apparatus. The dotted line on Fig. 3 relates to an apparatus in which the inner diameter of the cylinder 12 was two inches, and the dash-dot line relates to an apparatus in which the inner diameter of the outer cylinder was one inch. In all cases, the diameter of the cylinder 10 was one-half inch. The wave length corresponding to the mode of operation for small values of $b/c$ is substantially determined by the length of the cylindrical structure attached to the grid terminal 6, although it may be varied over a small range by other factors. The tuning range for a given structure is shown by the width of the enclosed areas for the value of $b/c$ corresponding to the structure. The tuning range of apparatus of the type shown in Fig. 2, however, is relatively great. The tuning is primarily determined by the position of the plunger 18 with respect to the grid terminal 6, although it also may be varied to a small extent by other factors (for instance, a retractable rod projecting into the inside of a cylinder 12 at a location of high electric field may provide such variation). It will be seen that the mode of operation illustrated in Fig. 2 occurs for values of $b/c$ of 79 percent or higher and that oscillations of substantial power levels may be expected to require a $b/c$ value of 85 percent or higher.

Fig. 4 shows, in longitudinal cross section, a suitable form of construction for an apparatus of the general type shown in Fig. 2. The vacuum tube 1 is shown in side elevation. The base of the vacuum tube 1 is provided with a metal connection 22 which is connected either directly or through a suitable by-pass condenser structure to the cathode of the tube. Good electrical connection between the outer tubular conductor 12 and the metal shell 22 is obtained by means of a beaded ring 23, an annular clip 24 which includes a slotted cylinder adapted to grip the shell 22, and a threaded cap 25. The anode terminal 4 is engaged by a clip 27 carried on a rod 28 to which the anode voltage is connected at the upper end. The clip 27 is preferably slotted to provide spring grip. The outer surface of the clip 27 carries on its upper portion an insulating sleeve 28 which may be of thin polystyrene tape or mica. The outer surface of the insulation 28 is engaged and covered by the end of the inner cylinder 10. The insulation 28 and the surrounding conductors provide a by-pass condenser furnishing the radio-frequency connection between the anode 4 and the resonator structure. For convenience of manufacture and assembly the surfaces engaging the polystyrene tape are preferably provided in conical form having a taper of about six degrees. The clip, the insulation 28, and the conductor 10 are held together by tightening the nuts 30 and 31 at the upper end of the rod 28.

The upper end of the rod 28 is mounted in an insulated bushing 32 fixed on the tubular conductor 10.

The plunger 18 includes an inner slotted cylinder 34 and an outer slotted cylinder 35, which together with a flat piece 36 form an annular cup. This cup may be drawn in one piece or made up of separate pieces soldered together. The slots, one of which is shown at 37, are adapted to divide the end portion of the cylindrical parts of the cup into spring fingers which are adapted to grip the walls of the conductors with which they engage and thus provide good electrical contact. The axial position of the plunger 18 may be adjusted by means of a plurality of rods, one of which is shown at 38, which are adapted to be operated in unison by manipulation of the member 39. The coupling loop 20 forms the end of a coaxial transmission line 40 which slides through the upper terminating wall 41 of the structure when the plunger 18 is moved. The position of the plunger 18 is adapted to be fixed by means of the threaded nut 42 mounted on a slotted and tapered threaded sleeve 43 which the nut 42 is adapted to press against the outer conductor of the transmission line 40 in order to hold it by frictional engagement.

The structure connected to the grid terminal 6 comprises the cylinder 17a and the transverse mounting member 17b. The member 17b is adapted to fit on the grid terminal 6 and is prevented from moving off the grid terminal 6 by the positioning pin 44 which also serves as an electrical connection to the grid. The pin 44 is shown insulated from the cylinder 12 by a bushing 45. If desired the pin 44 may be threaded into the bushing 45. Various means of providing the desired mechanical positioning and electrical contact of the structures 17a, 17b may be employed. It is desirable to provide such positioning means in a form which will permit removal of and replacement of the vacuum tube without difficulty.

As previously mentioned, the most important factor for the determination of the wave length of operation is the distance between the plunger 18 and the grid terminal 6. The length of the cylinder 17a is relatively unimportant, it being understood that this length is to be coordinated with the configuration of the lower cavity of the device, which is to say the cavity below the lower end of the cylinder 17a, in order to provide the proper feedback to the grid-cathode circuit within a desired tuning range, which may be quite extensive for a given configuration of the lower cavity. In the particular form of apparatus shown in Fig. 4, the length of the cylinder 17a is $\frac{3}{16}$ of the wave length corresponding to the middle of the tuning range of the device. Provided that the above-indicated relation between the inner diameter of the cylinder 17a and the inner diameter of the cylinder 12 are observed, the absolute size of these diameters is not critical, except that as very large diameters are approached the form of the resonator goes over to the radial type and departs from the coaxial cylinder type. The coaxial cylinder type is desirable because the wave length is relatively easily controlled by varying the length of the coaxial resonator. It is also believed to be more compact in construction. Illustrative dimensions of several devices embodying the present invention which have been built and successfully operated are given in the following table:

*Table I*

| Inner diameter of Cylinder 12 | Inner diameter of Cylinder 17a | Tuning Range (wave length) |
|---|---|---|
| Inches | Inches | Cm. |
| 1 | ¾ | 12.0–14.4 |
| 1½ | 1¼ | 13.6–17.4 |
| 2 | 1½ | 15.5–21.0 |

All the above devices had a cylinder 10 having an outer diameter of ½" and a length for the cylinder 17a of 1¼", including ⅛" overhang.

Fig. 5 shows another specific form of apparatus embodying the present invention. In this form of apparatus, the structure 17b is replaced by a biconical structure 47. The right-hand portion of the structure 47 provides a gradual transition between the relatively narrow spacing of the electrode terminal and the wide spacing between the end of the cylinder 17a and the cylinder 10. The right angle corner at the junction of the structures 17a and 17b (Fig. 4) is thereby avoided. The left-hand portion of the structure 47 likewise reduces the abruptness of the corner between the cylinder 17a and its connecting web, but to a lesser degree. In this particular form of apparatus it was found desirable to continue the overhang of the cylinder 17a to a considerable distance to the left of the structure 47. It is to be noted that the device of Fig. 5 is capable of functioning without the cylindrical sleeve 17a and with the biconical structure 47 arranged and constructed very much as shown in Fig. 5. The use of the sleeve 17a is, however, believed to improve the operation of the device.

In Fig. 5 a second plunger, the plunger 48, is shown, which has the function of adjusting the feedback to the grid-cathode circuit. The position of the plunger 48 is adjusted by means of the rods 49 which may be actuated together by the ring 50. As previously mentioned, the tuning of the device may be varied through a considerable range by the actuation of the plunger 18 without changing the setting of the plunger 48. The presence of the plunger 48, however, permits further extension of the range of the device. With the plunger 48 it is possible to obtain oscillations at relatively high power over a considerable range of wave lengths, such as over the range between 8 and 12 cm., or even more, with a single tuning device. The greater part of such range may be covered with a single setting of the plunger 48. The position of the plunger 48 has practically no effect upon the frequency, but affects chiefly the readiness with which the device oscillates, and hence the power of the oscillations.

The smallness of the effect of the adjustment of the plunger 48 upon the frequency of operation and the consequent advantages of the device are believed to arise from the structure associated with the grid-cathode space having a relatively low Q, when considered as a resonant transmission line, compared to the main resonator to which it is rather tightly coupled at the right-hand end of the resonator 47. Thus the operation and the tuning up of an apparatus such as that shown in Fig. 5 is quite different from the operation of an apparatus employing two resonant transmission lines having values of Q of approximately the same order of magnitude, one connected to the grid-cathode spacing and the other to the grid-plate spacing. In the latter type of device, a change in the frequency of operation usually requires the tuning of both resonant transmission lines, and the adjustment of each is relatively critical because of the interaction of the two tuning adjustments. In such apparatus, it is usually difficult to predict the desired setting for a given wave length of operation. In apparatus according to the present invention, because of the predominantly high Q of the main resonant cavity as compared with the cavity communicating with the grid-cathode space, the tuning of the device may be calibrated in terms of a single adjustment, which will be substantially unaffected by variations in the position of a plunger in the grid-cathode cavity if such a plunger is used.

An apparatus of the general form of Fig. 5 in which the cylinder 17a had a total length of 6.5 cm. and measured 4.5 cm. between the left-hand end of the biconical surface 47 and the right-hand end of the structure was constructed. The diameter of the cylinder 17a was approximately 5.1 centimeters, and the inner diameter of the cylinder 12 was 6.35 cm. A tuning range from 7.8 cm. to 11.4 cm. was obtained, of which the portion from 8.3 to 11.4 cm. was covered by actuation of the plunger 18 alone.

The provision of a cathode plunger such as the plunger 48 is particularly advisable for experimental apparatus where different types of grid structures performing the function of the structure 17 are likely to be used. The plunger 48 then enables "phasing-in" of the grid cavity.

A minor variation from the form of construction shown in Fig. 4 appears in the construction of the anode connection of Fig. 5. In Fig. 5, the by-pass condenser including the insulation 28 of Fig. 4 has been omitted and the cylinder 10 is at anode potential, being supported with a suitable piece of insulating material (not shown) at its right hand end. In order that the outer parts of the device, including the cylinder 12, may be operated at a steady (D. C.) potential other than the anode potential, the plunger 18 is provided in a modified form which is adapted to constitute a radio-frequency connection between the cylinders 10 and 12 without the necessity of actual electrical contact in the direct current sense. The plunger 18 is centered by its outer slotted cylindrical surface which by the spring action of the slotted segments firmly engages the inner surface of the cylinder 12 at the left-hand rim of the plunger 18. The inner axial wall of the plunger 18 is reversely folded in such a manner as to provide a narrow channel along the outer surface of the cylinder 10 and a slightly broader annular cavity 52 having its mouth at the right-hand end of the said narrow clearance. Both the narrow clearance and the cavity 52 are made of a length substantially equal to an electrical quarter-wave length for the mid-frequency of the tuning range of the device. At such frequency the short-circuit termination of the left-hand end of the annular cavity 52 will appear at the right-hand end of the annular cavity as a high impedance which will be in series with the termination of the narrow clearance space surrounding the cylinder 10 so that at the left-hand end of that narrow clearance space an effective radio-frequency short circuit will be created. At other frequencies within the tuning range, by virtue of the fact that the characteristic impedance of the annular cavity 52 (viewed as a coaxial conductor transmission line) is higher than the characteristic impedance of the transmission line formed by the narrow clearance space, a very high impedance will still appear at the right-hand end of the clearance space and consequently a very low impedance will again appear at its left-hand end. This impedance may thus not be zero at some frequencies of operation, but still, because of the fact that it is interposed in the resonator wall not at a point of high current density but at a point of at most moderate current density, on account of the configuration of the plunger 18, losses will be relatively low and very little energy will leak out of the resonator at any frequency of operation, in spite of the wide tuning range of the device.

Figure 6:
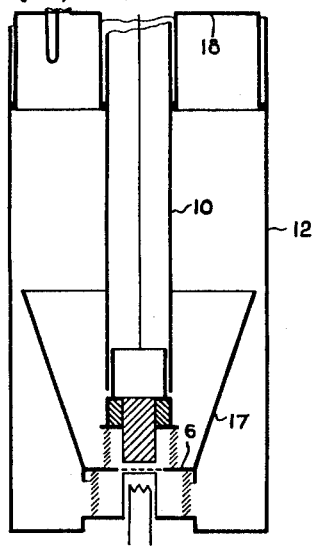
Figs. 6 and 7 are diagrams illustrating other forms of apparatus embodying the present invention.
Figure 7:
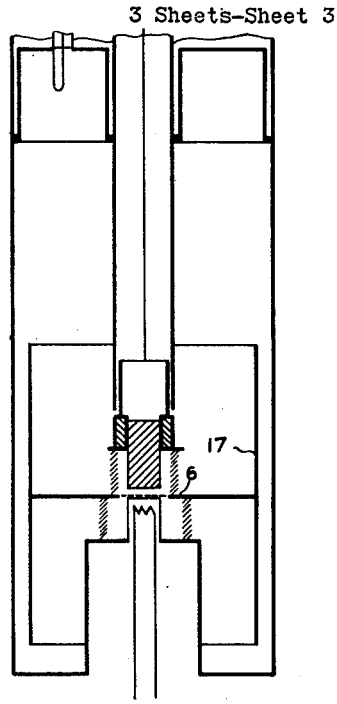

Figs. 6 and 7 show some of the other forms which the device of the present invention may assume. In the apparatus of Fig. 6 the structure 17 is provided in a conical form instead of in a cylindrical form. It functions in substantially the same manner as the right-hand portion of the structure 47 of Fig. 5. Thus the main resonator cavity in Fig. 6 is substantially the same shape as that of Fig. 5, but the grid-cathode cavity and its connection to the main cavity is slightly different in form, which is not of great importance, provided that the electrical length is adapted to provide the feedback within the range of phase angle suitable for maintaining oscillation. It will be seen from the arrangement of Fig. 6 that although the diameter of the structure 17 varies along its length, it is the diameter at the extremity farthest from the grid terminal 6 that determines whether the device will function according to the mode of operation illustrated in Fig. 2 or according to the mode of operation illustrated in Fig. 1. In Fig. 6, the change in diameter in the main resonant cavity defined by the structures 17 and 12 which occurs at the upper end of the structure 17 is relatively small so that the entire enclosure from the plunger 18 to the grid terminal 6 will operate as a resonator the natural frequency of which is primarily determined by the distance from the grid terminal 6 to the plunger 18 and is substantially independent of the length of the structure 17.

An apparatus built in the form shown in Fig. 6, but provided, in order to facilitate experimental investigation, with a tuning plunger for the grid-cathode cavity, as shown in Fig. 5, was found to have a tuning range extending from 9.2 to 11.4 cm. wave lengths, the maximum power being obtained between 10 and 11 cm., and in this latter range the oscillations appeared to be unusually vigorous.

Fig. 7 illustrates another apparatus embodying the present invention. The distinguishing feature of this particular form of apparatus is the fact that the extension of the structures 17 on the cathode side has been made approximately equal in length to that of the anode portion which extends upward from the grid terminal 6. This shows the wide range within which the configuration of the grid-cathode cavity may be varied. Such an apparatus, built with a total length of the structure 17 of six centimeters was found to produce oscillations over the range between 8.38 and 10.7 cm. wave lengths and also for a range of wave lengths above 12.7 centimeters in length. It is to be expected that if the device were provided with a plunger in the grid-cathode cavity such as the plunger 48 of Fig. 5, oscillations could be obtained with such a device between 10.7 and 12.7 cm. wave lengths by adjustment of such plunger.

Although Fig. 2 shows specifically the "three-quarters" mode of oscillation, which is to say that there is a voltage node at the plunger 18 and another in the neighborhood of the glass wall 8, so that the vacuum tube accounts for almost an electrical quarter-wave length, and the resonator acts as a ¾ wave length resonator, oscillations can also be obtained in higher modes such as the 5/4 mode. For the same wave length, the 5/4 mode requires a longer resonator than the ¾ mode. In the ¾ mode, movement of the plunger 18 through a unit distance results in a change of approximately ⅓ units in wave length, whereas in the 5/4 mode such movement of the plunger 18 would result in approximately a ⅘ unit change in wave length.

Data above given relating to the tuning range of resonators of various sizes was obtained from measurements made under continuous operation of the devices herein described. Although it has been reported by others that apparatus of the type shown in Fig. 1 operates at substantially different wave lengths under conditions of short-pulse intermittent operation, as distinguished from substantially continuous operation, such measurement as has so far been made with apparatus of the present invention, typically represented by Fig. 2, indicates that no great difference in wave lengths of operation is to be expected when the resonator is employed under conditions of short-pulse intermittent operation. Although no great change in wave length has so far been found when intermittent operation is substituted for continuous operation, it has been found difficult to obtain high power oscillations of the short-pulse intermittent type over the wide tuning ranges possible with apparatus under the present invention under conditions of continuous operation. This is believed to result from the stricter requirements for proper phasing of the grid-cathode excitation in order to produce the rapid build-up of oscillations necessary for short pulses of high peak power. Satisfactory operation with intermittent short-pulse activation may nevertheless be obtained over a reasonable tuning range, although as just pointed out, the tuning range for this purpose is not usually as extensive as that obtainable under conditions of continuous operation.

What is claimed is:

1. An oscillator comprising, in combination, a vacuum tube having at least a grid, a cathode and an anode, a closed hollow outer conducting cylinder, an inner cylinder positioned coaxially therewith, said outer cylinder being in electrical contact with said cathode and said cylinder being in electrical contact with said anode, an axially adjustable torroidal plunger positioned in the space determined by said inner and outer cylinders and in electrical contact respectively with the outer and inner surfaces thereof, and an intermediate member having a conducting surface of revolution being positioned substantially coaxially with said inner and outer cylinders and in electrical contact at one end with said grid and open at the other end, the diameter of said intermediate member at said open end being at least 85% of the inner diameter of said outer cylinder but less than the inner diameter of said outer cylinder.

2. Apparatus as defined in claim 1 including a coupling loop inserted through said plunger and extending into the space determined by said inner and outer cylinders.

3. A high frequency oscillator comprising, in combination, a lighthouse type vacuum tube having circular external connectors for its anode, cathode and control grid, coaxial inner and outer hollow conductive cylinders respectively electrically connected to the anode and cathode connectors of said tube, and an intermediate conductive member having inner and outer surfaces of revolution, said members being connected at one end to the grid connector of said tube and partially enclosing said inner cylinder, the inner surface of said intermediate member together with said inner and outer cylinders constituting a resonator coupled to the grid-anode space of said tube, the outer surface of said intermediate member together with said outer cylinder constituting a low impedance coupling between said resonator and the grid-cathode space of said tube.

4. Apparatus in accordance with claim 3 including an axially adjustable plunger effectively joining said inner and outer cylinders for radio frequency oscillations.

5. Apparatus in accordance with claim 4 including a coupling loop projecting through said plunger into said resonator for coupling energy from said oscillator.

6. A high frequency oscillator comprising, in combination, a lighthouse type vacuum tube having circular external connectors for its anode, cathode and control grid, coaxial inner and outer hollow conductive cylinders being respectively electrically connected to the anode and cathode connectors of said tube, and an intermediate hollow conductive cylinder being electrically coupled to the grid of said tube, the inner surface of said intermediate cylinder defining in cooperation with said inner and outer cylinders a resonator coupled to the grid-anode space of said tube, the outer surface of said intermediate cylinder and the inner surface of said outer cylinder constituting a low impedance coupling between said resonator and the grid-cathode space of said tube.

7. Apparatus in accordance with claim 6 including an axially adjustable plunger effectively joining said inner and outer cylinders for tuning the frequency of the oscillator.

8. Apparatus in accordance with claim 7 including coupling means projecting through said plunger for coupling energy from said resonator.

9. A high frequency oscillator comprising, in combination, a vacuum tube having a cathode, an anode, and a control grid, said tube elements having circular external connectors therefor, coaxial inner and outer hollow conductive cylinders being respectively electrically coupled to the anode and cathode connectors of said tube, and an intermediate hollow conducting cylinder being connected at one end to the grid connector of said tube, the other end of said intermediate cylinder partially enclosing said inner cylinder, the inner surface of said intermediate cylinder defining in cooperation with the outer surface of said inner cylinder and the inner surface of said outer cylinder a resonator coupled to the anode-grid space of said tube, said resonator having no electrical discontinuities therein when said oscillator is energized, the outer diameter of said intermediate cylinder being so related to the inner diameter of said outer cylinder that the outer surface of said intermediate cylinder defines in cooperation with the inner surface of said outer cylinder a low impedance coaxial conductor transmission line coupling said resonator to the grid-cathode space of said tube.

10. A tunable high frequency oscillator comprising, in combination, a vacuum tube having a cathode, an anode, and a control grid, said tube elements having circular external connectors therefor, coaxial inner and outer hollow conductive cylinders being respectively coupled to the anode and cathode connectors of said tube, an axially adjustable plunger effectively joining said inner and outer cylinders for radio frequency oscillations, and an intermediate conductive member having inner and outer surfaces of revolution being connected at one end to the grid connector of said tube and being positioned coaxially with said inner and outer cylinders, said intermediate conductive member partially enclosing said inner cylinder, the inner surface of said intermediate conducting member in cooperation with the outer surface of said inner cylinder, said plunger and the inner surface of said outer cylinder defining a resonator coupled to the anode-grid space of said tube, the diameter of the outer surface of said intermediate member at the end thereof furthest removed from said grid connector being so related to the inner diameter of said outer cylinder that the outer surface of said intermediate member defines in cooperation with the inner surface of said outer cylinder a low impedance coaxial conductor transmission line coupling the above-defined resonator to the grid-cathode space of said tube.

11. An oscillator comprising, in combination, a vacuum tube having at least a cathode, an anode and a control grid, coaxial inner and outer hollow conductive cylinders being respectively electrically coupled for the interchange of radio frequency energy to the anode and cathode of said tube, an intermediate conducting member having inner and outer conducting surfaces in the form of surfaces of revolution, said intermediate conducting member being electrically connected at one end to the grid of said tube, the other end of said intermediate member partially enclosing said inner conductive cylinder and having a diameter so related to the diameter of said outer cylinder that said intermediate and outer cylinders at said other end of said intermediate member effectively form a transmission line of low characteristic impedance, and an adjustable annular member connecting said inner and outer conducting cylinders.

12. An oscillator comprising, in combination, a vacuum tube having an anode, a cathode, a control grid, and external circular connectors therefor, first, second and third coaxial conductive hollow cylinders of different diameters, each of said cylinders having inner and outer conducting surfaces, said first cylinder being coupled to the anode of said tube for the interchange of radio frequency oscillations between said anode and the outer surface of said first cylinder, said second cylinder being electrically coupled to the cathode connector of said tube, said third cylinder being of a diameter intermediate said first and second cylinders and connected at one end to the grid connector of said tube, partially enclosing said first cylinder, the diameter of said third cylinder being less than the inner diameter of said second cylinder but at least 4/5 of the inner diameter of said second cylinder, and an adjustable annular member effectively connecting the outer surface of said first cylinder with the inner surface of said second cylinder for radio frequency energy.

13. A tunable high frequency oscillator comprising, in combination, a vacuum tube having a cathode, an anode, and a control grid, said tube elements having circular external connectors therefor, coaxial inner and outer hollow conductive cylinders being respectively electrically coupled to the anode and cathode connectors of said tube, an axially adjustable plunger effectively joining said inner and outer cylinders for radio frequency oscillations, and an intermediate hollow conductive cylinder being connected at one end to the grid connector of said tube and being positioned coaxially with said inner and outer cylinders, said intermediate cylinder having a diameter at least 4/5 the inner diameter of said outer cylinder but less than the inner diameter of said outer cylinder, the inner surface of said intermediate cylinder in cooperation with said inner cylinder, said plunger and the inner surface of said outer cylinder defining a resonator coupled to the anode-grid space of said tube, the outer surface of said intermediate cylinder defining in cooperation with the inner surface of said outer cylinder a low impedance coaxial conductor transmission line coupling the above-defined resonator to the grid cathode space of said tube.

14. A high frequency oscillator which is tunable over a substantial range of frequencies comprising, in combination, a vacuum tube having at least a cathode, an anode, and a control grid, said tube elements having external circular connectors therefor, coaxial inner and outer hollow conductive cylinders being respectively electrically connected to the cathode and anode connectors of said tube, an intermediate conducting member having inner and outer surfaces of revolution, the inner surface of said intermediate member being connected at one end thereof to the grid connector of said tube, the other end of said intermediate member partially enclosing said inner conducting cylinder, said intermediate conducting member being mounted coaxially with said inner and outer cylinders and having an outer diameter at said other end at least 4/5 of the diameter of said outer member but less than the diameter of said outer member, and an adjustable annular member connecting said inner and outer conductive cylinders.

15. A tunable high frequency oscillator comprising, in combination, a vacuum tube having a cathode, an anode and a control grid, said tube elements having external circular connectors therefor, coaxial inner and outer hollow conductive cylinders being respectively electrically connected to the anode and cathode connectors of said tube, means axially adjustable with respect to said cylinders effectively joining said inner and outer cylinders for radio-frequency oscillations, and an intermediate hollow conductive cylinder being connected at one end to the grid connector of said tube and being positioned coaxially with said inner and outer cylinders, said intermediate cylinder partially enclosing said inner cylinder and having an outer diameter which is less than the inner diameter of said outer cylinder and at least about 4/5 of the inner diameter of said outer cylinder, said intermediate cylinder defining in cooperation with the inner surface of said outer cylinder a coaxial conductor transmission line leading from the grid-anode space of said tube to the grid-cathode space of said tube.

16. A high frequency oscillator comprising, in combination, a vacuum tube having a cathode, an anode, and a control grid, said tube elements having circular external connectors therefor, coaxial inner and outer hollow conductive cylinders being respectively electrically coupled to the anode and cathode connectors of said tube, and an intermediate conducting member having substantially parallel inner and outer conical surfaces, the smaller end of said intermediate member being electrically coupled to the grid connector of said tube, said intermediate member being positioned coaxially with said inner and outer cylinders, the larger end of said member partially enclosing said inner cylinder, the inner surface of said intermediate member defining in cooperation with the outer surface of said inner cylinder and the inner surface of said outer cylinder a resonator coupled to the anode-grid space of said tube, the diameter of the larger end of said intermediate member being so related to the inner diameter of said outer cylinder that the outer conical surface of said intermediate member defines in cooperation with the inner surface of said outer cylinder a low impedance coaxial conductor transmission line coupling said resonator to the grid-cathode space of said tube.

J. B. H. KUPER.
P. A. COLE.

REFERENCES CITED

The following references are of record in the file of this patent:

UNITED STATES PATENTS

| Number | Name | Date |
|---|---|---|
| 2,163,589 | Dallenbach | June 27, 1939 |
| 2,408,927 | Gurewitsch | Oct. 8, 1946 |
| 2,409,640 | Moles | Oct. 22, 1946 |
| 2,419,564 | Keister | Apr. 29, 1947 |
| 2,247,558 | Jensen et al. | Sept. 16, 1947 |
| 2,428,609 | Beggs | Oct. 7, 1947 |

Certificate of Correction

September 19, 1950

Patent No. 2,523,122

JAMES B. H. KUPER ET AL.

It is hereby certified that error appears in the printed specification of the above numbered patent requiring correction as follows:

Column 11, line 54, before the word "cylinder" insert *inner*; and that the said Letters Patent should be read as corrected above, so that the same may conform to the record of the case in the Patent Office.

Signed and sealed this 29th day of May, A. D. 1951.

[SEAL]

THOMAS F. MURPHY,
*Assistant Commissioner of Patents.*